United States Patent
D'Alessandro et al.

[19]

[11] Patent Number: 6,005,659

[45] Date of Patent: Dec. 21, 1999

[54] MINI-DISC LASER POWER METER AND METHOD OF MAKING THE SAME

[75] Inventors: Louis D. D'Alessandro, Saddlebrook, N.J.; Izrail F. Pinzavetsky, San Francisco, Calif.

[73] Assignees: Sony Corporation, Tokyo, Japan; Sony Electronics, Inc., Park Ridge, N.J.

[21] Appl. No.: 09/210,597

[22] Filed: Dec. 15, 1998

Related U.S. Application Data

[60] Provisional application No. 60/084,671, May 7, 1998.

[51] Int. Cl.[6] .................................................... G01J 1/42
[52] U.S. Cl. ................................. 356/213; 356/220
[58] Field of Search .............................. 356/213, 218, 356/220; 369/1, 2

[56] References Cited

U.S. PATENT DOCUMENTS 3,966,325  6/1976  Mohler .................................. 356/218
5,307,326  4/1994  Osawa .......................................... 369/2

OTHER PUBLICATIONS

Leader® Laser Power Meter Model LPM–8001 Instruction Manual.

*Primary Examiner*—Frank G. Font
*Assistant Examiner*—Layla Lauchman
*Attorney, Agent, or Firm*—Ronald P. Kananen; Rader, Fishman & Grauer

[57] ABSTRACT

A laser power meter of the present invention including a laser power sensor and a power meter module is used for measuring the power level of a laser source in a minidisc recorder/player. The laser power sensor includes a photodetector and a variable resistor electrically connected together and housed in a cartridge-like housing that is equivalent in dimension to a minidisc used in the minidisc recorder/player. The laser power sensor is inserted into the minidisc recorder/player like a regular minidisc, thus allowing laser power readings without disassembling the recorder/player.

21 Claims, 3 Drawing Sheets

MINI-DISC LASER POWER METER AND METHOD OF MAKING THE SAME

This application claims benefit of Provisional Appln. 60/084,671 filed May 7, 1998.

FIELD OF INVENTION

The present invention relates to the filed of laser power meters. Specifically, the present invention relates to a laser power meter adapted to measure the power level of a laser produced by an optical disk reading apparatus such as a mini-disc recorder/player.

BACKGROUND OF THE INVENTION

Several different affordable optical storage mediums have drastically improved the quality of recorded data and the usage of that data in applications as diverse as video recordings, audio recordings and computer data storage. Examples of such affordable optical storage mediums include, but are not limited to, laser discs (LDs), compact discs (CDs, CD-ROMs), digital versatile discs (DVDs) and the like. With the creation of these optical storage mediums, there has been a consequent development of various devices capable of recording data to and reading data from one these types of optical storage mediums. In particular, minidiscs (MDs) and MD recorder/players have been introduced as a versatile data storage and retrieval system.

MDs are packaged in a cartridge-like housing similar to, but smaller than, that of 3.5" floppy disks. MD players are similar to CD players in that a laser light is used to record/read data stored on the MD. In order for the data on the MD to be correctly read or written, the power of the laser light must be calibrated and maintained at a specific operating power level. For this task, laser power meters are used to measure the power output of the laser light in MD recorder/player devices.

However, currently available laser power meters are provided on a rod, which typically includes a hinge. The rod is used to insert the light detector of the meter into the MD recorder/player device to measure the power of the laser. However, because the distance between the meter and the laser is not held constant, particularly if the hinge in the rod is inadvertently pivoted during insertion of the meter, consistent and accurate readings cannot be obtained. The alternative is to disassemble the recorder/player to access the laser. However, disassembly is inconvenient, and may result in damage or misalignment of components.

Consequently, there is a need in the art for an apparatus and method for measuring the power output of a laser in an MD recorder/player, or other optical disc recorder/player, without disassembling the device to access the laser light source.

SUMMARY OF THE INVENTION

Therefore, it is the object of the present invention to meet the above-identified needs and others. Specifically, it is an object of the present invention to provide a laser power meter that does not require disassembling the MD recorder/player when a measurement is to be taken.

Another object of the present invention is to provide an inexpensive way to manufacture such a laser power meter thereby providing an inexpensive laser power meter to the end user. Yet another object of the present invention is to provide a laser power meter that is easy to use.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a laser power meter for use with an MD recorder/player device housed in an identical cartridge-like housing as that of a typical MD usable with the MD recorder/player device. Therefore, the laser power meter of the present invention is inserted into the cartridge bay of an MD recorder/player device like a regular MD and the power reading is made without having to disassemble the device.

A further advantage of laser power meter of the present invention is that the laser power sensor of the present invention may be used in conjunction with any type of power meter. That is to say, the laser power sensor according to the present invention may be connected to any analog or digital power meter, providing versatility to the user.

BRIEF DESCRIPTION OF DRAWINGS

The accompanying drawings illustrate the present invention and are a part of the specification. Together with the following description, the drawings demonstrate and explain the principles of the present invention.

DETAILED DESCRIPTION OF THE INVENTION

Using the drawings, the preferred embodiments of the present invention will now be explained.

Figure 1:
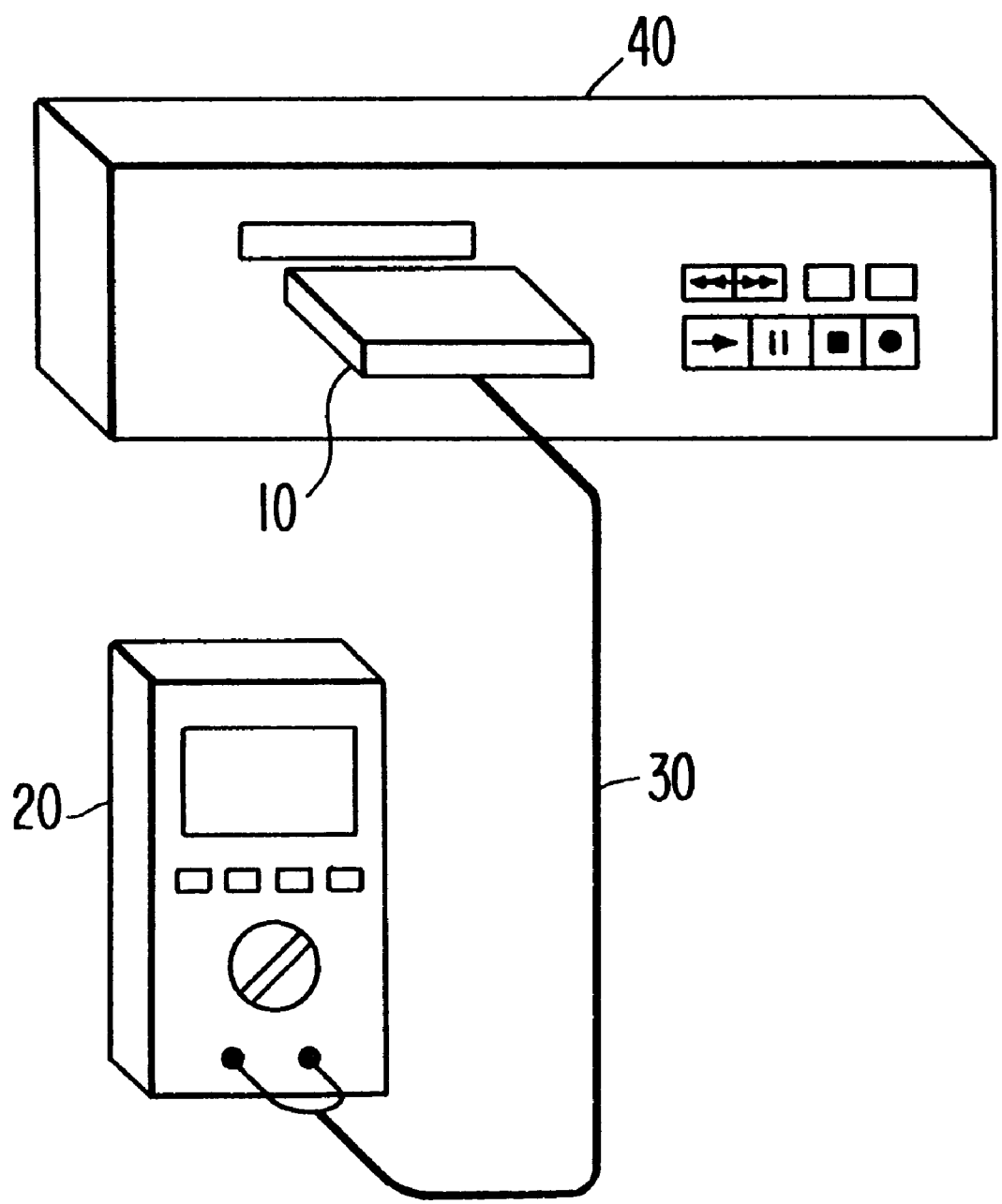
FIG. 1 shows a laser power meter of the present invention.

FIG. 1 shows a block diagram of a laser power meter of the present invention. The laser power meter according to the present invention includes a laser power sensor 10 and a power meter 20. The laser power sensor 10 according to the present invention is connected to the power meter 20 via an electrical connection 30.

Electrical connection 30 is preferably an electric cable of the twisted pair-type. However, other types of electrical connection may be used including a wireless connection. For example, an optical connection, such as an infrared (IR) transmitter/receiver pair may be used. Alternatively, a radio-frequency (RF) transmitter/receiver pair or an ultrasonic transmitter/receiver pair may be employed. Any such method of communicating data from the power sensor 10 to the power meter 20 is considered equivalent for purposes of the present invention.

Power meter 20 receives the measured signal from the laser power sensor 10 and displays the reading on its display. Power meter 20 may be an analog or digital power meter. For example, power meter 30 may be a scope-type meter such as an oscilloscope, a deflection-type meter such as a swinging needle-type meter, a numerical liquid crystal display, etc. In the embodiment illustrated in FIG. 1, power meter 20 is a digital multi-meter.

Figure 2:
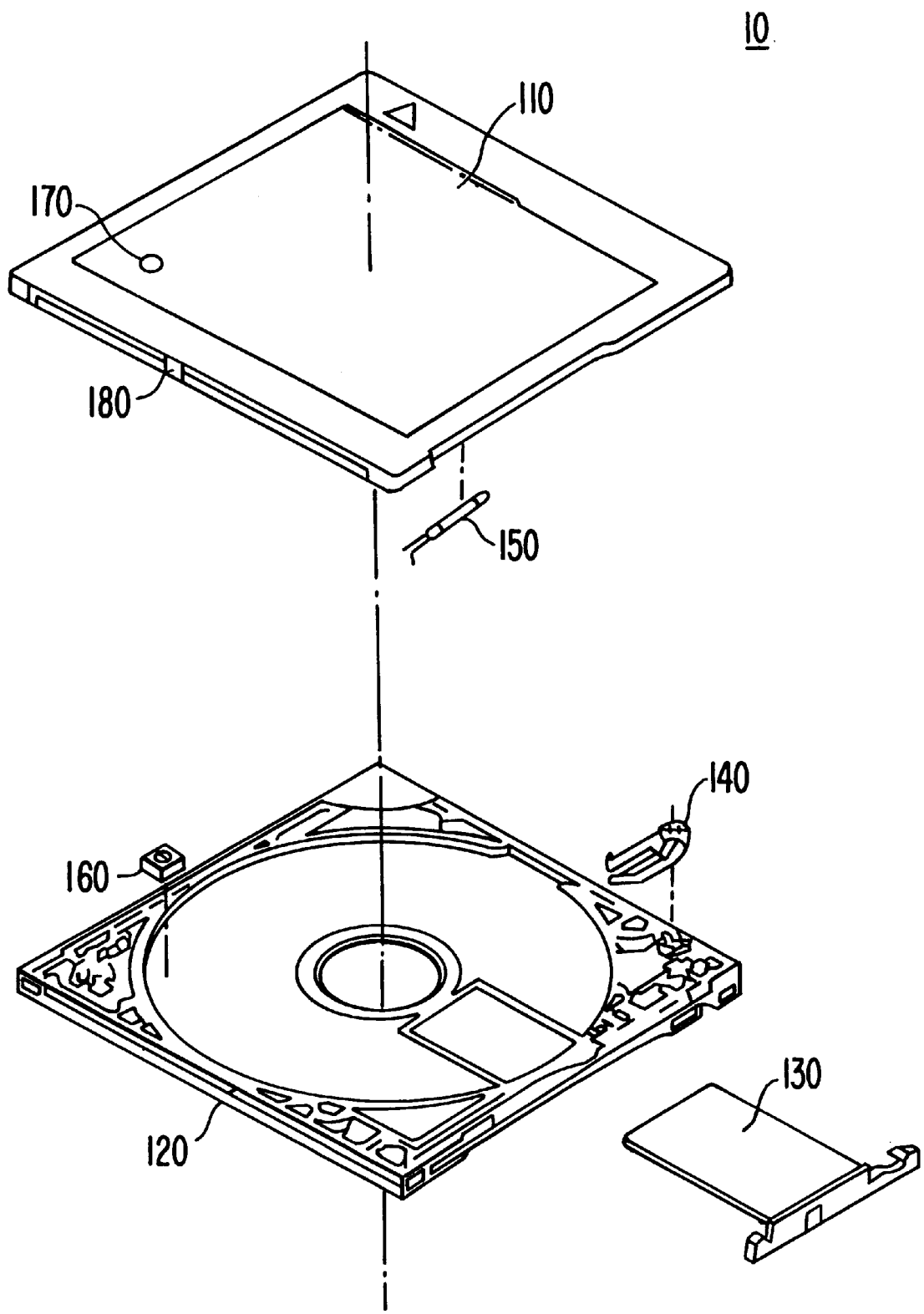
FIG. 2 is an exploded view of a laser power sensor of the present invention.

FIG. 2 shows an exploded view of the laser power sensor 10. Laser power sensor 10 includes an upper housing shell 110 and lower housing shell 120 which form the cartridge-like housing for the internal components of the laser power sensor 10. The lower housing shell 120 further includes a shutter 130 and a shutter lock 140 for preventing the shutter from opening unless the laser power sensor 10 is placed inside the MD recorder/player device 40 (FIG. 1). The upper and lower housing shells 110 and 120, when assembled, form a cartridge-like housing that is dimensionally equivalent to a typical MD.

The upper and lower housing shells 110, 120 house a photodetector 150 and a variable resistor 160 electrically connected together. Photodetector 150 is preferably a silicon photo-voltaic detector in a long hermetically sealed glass tube which generates approximately 0.4 Vdc in moderate light. Variable resistor 160 is preferably a 4 mm square, 1 KΩ single-turn trimmer potentiometer. However, other types of photodetectors and variable resistors having various configurations may be used without departing from the scope of the present invention.

The upper housing shell 110 further includes a bore 170 to accommodate the variable resistor 160. A notch 180 formed on the upper housing shell 110 accommodates the electrical connection 30 which electrically connects the sensor 10 to the power meter 20.

Figure 3A:
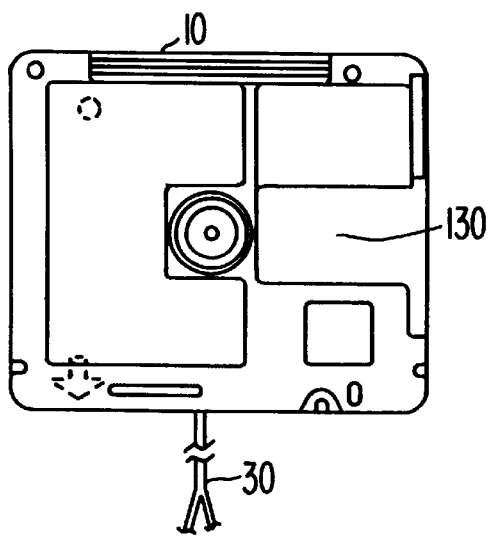
FIGS. 3A and 3B are a top bottom and top view of an assembled laser power sensor of the present invention.
Figure 3B:
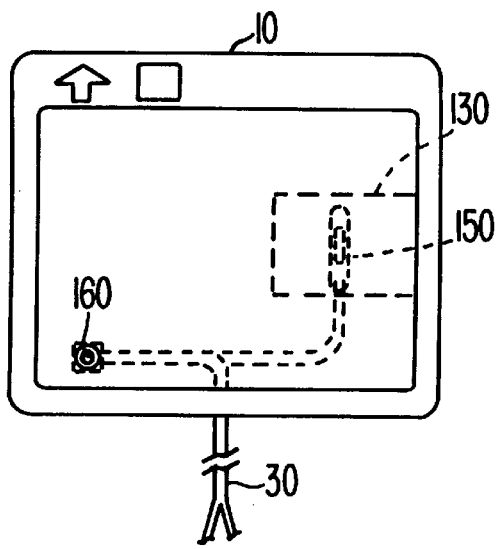

FIGS. 3A and 3B show bottom and top views, respectively, of the laser power sensor 10 in an assembled state. As shown, the variable resistor 160 protrudes from, or is accessible through, bore 170 for calibration purposes. Photodetector 150 is diagonally centered above the shutter 130 and is electrically connected via electrical wires, for example, to the variable resistor 160 as shown by the dotted lines in FIG. 3B.

Calibration of the Laser Power Sensor

Once the laser power sensor 10 is assembled, it is calibrated by the following method. Using the power meter 20, an initial resistance measurement is taken of a pre-calibrated laser power sensor. Then, the MD recorder/player device 40 is placed into a test mode and the pre-calibrated laser power sensor is inserted into the MD cartridge bay (see FIG. 1). Then, the laser power of the MD recorder/player is set to 0.7 mW and the forward button (>>) is pressed to advance the laser head towards the photodetector in the laser power sensor until a measurement is registered on the power meter.

When a measurement is detected, the reverse button (<<) and the forward button (>>) are jogged back and forth until the highest reading is detected on the power meter. The highest or peak reading corresponds to a situation in which the laser of the MD recorder/player is directly aligned with the light sensor 150 of the pre-calibrated laser power sensor. Once obtained, the peak reading is noted. Then the pre-calibrated laser power sensor is ejected from the MD recording/player 40 and the laser power sensor to be calibrated 10 is inserted. Using the power meter 20, the resistance of the uncalibrated laser sensor 10 is measured. If the resistance measurement is different from the pre-calibrated laser power sensor, the variable resistor 160 is adjusted until the resistance measurement is roughly the same as that of the pre-calibrated laser power sensor. Next, the uncalibrated sensor 10 is inserted in the MD recorder/player 40 and again, the reverse (<<) and forward (>>) buttons are jogged until the highest reading is achieved.

If the peak reading from the uncalibrated sensor 10 does not correspond with that of the pre-calibrated sensor, the sensor is ejected and the variable resistor 160 is adjusted and the power readings repeated. Once the calibration is finished, the variable resistor 160 is painted with, for example, a locking compound such that the resistance is not accidentally changed during subsequent usage. A protective covering, such as an adhesive tape, may also be placed over the bore 170 for further protection.

Operation of the Laser Power Meter

Figure 4:
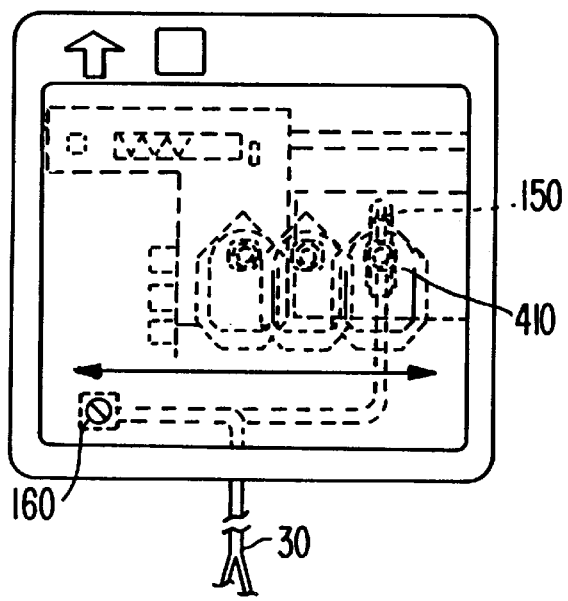
FIG. 4 shows the movement of a laser source with respect to the laser power sensor of the present invention.

The operation of the laser power meter of the present invention is explained below. By referring to the appropriate service manual, the MD recorder/player device 40 is placed into a test mode. As shown in FIG. 1, a calibrated laser power sensor 10 is inserted into the MD cartridge bay and the laser source in the MD recorder/player is activated by following the appropriate directions in the service manual. As shown in FIG. 4, the laser source 410 inside MD recorder/player device 40 is moved back and forth by using the forward (>>) and reverse (<<) buttons. Therefore, the (<<) and (>>) buttons are jogged until the objective lens is aligned with the photodetector 150. Correct alignment is determined when the highest reading is achieved on the power meter 20.

In the preferred embodiment of the present invention, the reading displayed on the power meter 20 is calibrated to a Leader® Laser Power Meter model LPM-8001 such that the power meter 20 of the present invention displays a reading ten times higher than the measurement stated in the service manual. Furthermore, this calibration also displays the meter reading in mV instead of mW as displayed by the Leader® power meter.

For example, a 0.7 mW reading on the Leader® power meter will be displayed as 7.0 mV on the power meter 20. Similarly, a 3.5 mW reading on the Leader® power meter will read as 35 mV on the power meter 20. Therefore, the power meter 20 may be calibrated to perform automatic conversions similar to the example above.

Assembly Procedure for the MD Laser Power Sensor

An economical method for making an MD laser power sensor according to the present invention will now be explained.

1) Taking a typical MD, the shutter 130 is removed by lifting the shutter from the bottom and unsnapping it from the shell housing. Using, for example, a flat blade screwdriver, the MD housing is split by separating the shell into the upper housing shell 110 and lower housing shell 120. Starting at the wide gap near the shutter, the screwdriver blade is twisted to work the shell apart. Care must be taken not to damage the shell. Alternatively, a disassembled MD shell housing can be obtained which is already separated as upper and lower portions.

2) When the housing has been separated, the pre-recorded disc is removed and disposed of. Care must be taken not to loosen the black plastic shutter locking clip as this will be needed later when the shell is reassembled. Using cutting pliers, a 0.1" notch 180 is cut in the rear of the shell.

3) Both halves of the shell are temporarily placed back together. The "window" of the shell which was exposed by removing the shutter is diagonally measured to determine the center point of the window. A scribing tool is then used to mark the bottom plastic shell 120 at that center point. This is where the photo-voltaic sensor 150 will be mounted. The small dark square area of the photo-voltaic cell is the "active" area. Hence, this is the part of the cell that needs to be centered in this step.

4) The two parts of the MD shell are again separated and a ¼" hole 170 is drilled in the upper housing shell 110 to accommodate the potentiometer 160 which is to be placed on the lower housing shell 120. The two shell halves are realigned and, through the ¼", the bottom part of the shell is marked with the scribing tool where the potentiometer 160 will be mounted.

5) Using, for example, a hot glue gun, a small amount of glue is dabbed at the point of the shell where the sensor 150 will be mounted. Working quickly, with the red dot of the sensor facing up, the photo-voltaic sensor 150 is pressed onto the glue and aligned before the glue sets.

6) The two wires are peeled off of a bulk ribbon wire 30 (see, FIGS. 3 and 4) and cut to a length of, for example, 7". A small knot is tied in one end of the wire about ½" from one end, leaving the rest of the wire free. The wire is placed so that the knot is just inside the shell. The wire is then run through the notch 180 cut in step 2. The wire 30 may then be tacked in place with hot glue. About ¹⁄₁₆" or the insulated jacket may be stripped off of both ends of this wire to provide bare leads.

7) A ½" of sleeving material is then placed over one of the bare wire leads of the sensor. A 1K potentiometer is then soldered in parallel to the sensor 150 and to the wire lead 30 placed into the cutout notch 180.

8) Using the hot glue, a small dab of glue is placed on the bottom shell below the spot were the ¼" hole was drilled and the alignment mark was scribed in step 4. The potentiometer 160 is glued to this spot before the hot glue sets.

9) Using hot glue or a suitable plastic glue, the two halves of the shell are realigned and reassembled. Care must be taken to properly position the shutter locking clip before gluing and to verify that the glue will not hamper its movement. If a long time is required for the glue to set, the two halves of the shell may be clamped in position.

10) After the glue has set, the shutter door is re-attached and should be checked to verify that it slides freely and latches properly.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A laser power meter for measuring a power level of a laser source in an optical disc recorder/player device used for recording/reading data on and optical disc comprising:

a power metering module;

a laser power sensor; and an electrical connection for electrically connecting said laser power sensor to said power metering module, said laser power sensor comprising a housing having dimensions equivalent to a cartridge of said optical disc.

2. The laser power meter as set forth in claim 1, wherein said laser power sensor further comprises:

a photodetector; and a variable resistor electrically connected to said photodetector.

3. The laser power meter as set forth in claim 2, wherein:

said housing comprises an upper housing shell and a lower housing shell, said upper housing shell including a bore for receiving said variable resistor and a notch for accommodating said electrical connection means, and said lower housing shell including a shutter and a shutter locking mechanism, wherein said shutter locking mechanism prevents opening of said shutter unless said laser power sensor is inserted into said optical disc recorder/player device.

4. The laser power meter as set forth in claim 1, wherein said electrical connection is an electrical cable.

5. The laser power meter as set forth in claim 1, wherein said electrical connection is a wireless connection.

6. The laser power meter as set forth in claim 1, wherein said power metering module is an analog power meter.

7. The laser power meter as set forth in claim 1, wherein said power metering module is a digital power meter.

8. A laser power sensor used for measuring a power level of a laser source in a minidisc recorder/player device used for recording/reading data on a minidisc comprising:

a photodetector, a variable resistor electrically connected to said photodetector, and a housing encasing said photodetector and said variable resistor, said housing having dimensions equivalent to said minidisc.

9. The laser power sensor as set forth in claim 8, wherein:

said housing comprises an upper housing shell and a lower housing shell, said upper housing shell including a bore for receiving said variable resistor and a notch for accommodating said electrical connection means, and said lower housing shell including a shutter and a shutter locking mechanism, wherein said shutter locking mechanism prevents opening of said shutter unless said laser power sensor is inserted into said minidisc recorder/player device.

10. A laser power meter for measuring a power level of a laser source in an optical disc recorder/player device used for recording/reading data on an optical disc comprising:

means for sensing a power level of a laser source;

means for displaying said power level of said laser source; and means for electrically connecting said sensing means and said display means, wherein said sensing means further comprises housing means with dimensions equivalent to a housing of said optical disc.

11. The laser power meter as set forth in claim 10, wherein said sensing means further comprises:

means for detecting light emissions; and means for variably changing a resistance electrically connected to said light detecting means.

12. The laser power meter as set forth in claim 11, wherein:

said housing means comprises an upper housing shell and a lower housing shell, said upper housing shell including means for receiving said variable resistor and means for accommodating said electrical connection means in said upper housing shell, and said lower housing shell including means for providing an opening to said light detecting means such that said light detecting means is exposed to said laser source, and means for preventing said opening means from exposing said light detecting means unless said sensing means is inserted into said optical disc recorder/player device.

13. The laser power meter as set forth in claim 10, wherein said electrical connection means is an electrical cable.

14. The laser power meter as set forth in claim 10, wherein said electrical connection means is a wireless connection.

15. The laser power meter as set forth in claim 10, wherein said displaying means is an analog power meter.

16. The laser power meter as set forth in claim 10, wherein said displaying means is a digital power meter.

17. The laser power meter as set forth in claim 11, wherein said light detecting means is a photo-voltaic cell.

18. The laser power meter as set forth in claim 11, wherein said variable resistance means is a potentiometer.

19. A method of calibrating a laser power sensor used for measuring a power level of a laser source in a minidisc recorder/player device used for recording/reading data on a minidisc including a photodetector and a variable resistor electrically connected to said photodetector housed in a housing having dimensions equivalent to said minidisc, said method comprising the steps of:

A) measuring an initial resistance of a pre-calibrated laser power sensor;

B) placing said minidisc recorder/player device into a test mode;

C) inserting said pre-calibrated laser power sensor into said minidisc recorder/player device;

D) setting the power level of a laser source of said minidisc recorder/player device to an initial power level;

E) moving said laser source back and forth until a highest power reading is detected;

F) ejecting said pre-calibrated laser power sensor from said minidisc recorder/player device;

G) measuring the resistance of an uncalibrated laser power sensor;

H) adjusting said variable resistor until the resistance of said uncalibrated laser power sensor is substantially equal to the initial resistance of said pre-calibrated laser power sensor;

I) inserting said uncalibrated laser power sensor into said mindisc recorder/player device;

J) setting the power of said laser source to said initial power level;

K) moving said laser source back and forth until a highest power reading is detected;

L) if the highest power reading of said pre-calibrated laser power sensor is not substantially equal to the highest power reading of said uncalibrated laser power sensor, adjusting the variable resistor of said uncalibrated laser power sensor and repeating step (K); and M) repeating step (L) until the highest power reading of said uncalibrated laser power sensor is substantially equal to said pre-calibrated laser power sensor.

20. A method of making a laser power meter used for measuring a power level of a laser source in a minidisc recorder/player device used for recording data to and reading data from a minidisc, comprising disposing a laser power sensor in a minidisc housing for insertion into said recorder/player device.

21. The method of claim 20, wherein said step of disposing a laser power sensor in a minidisc housing comprising the steps of:

A) removing a shutter from said housing forming an opening;

B) separating said housing by splitting the housing into an upper housing shell and a lower housing shell;

C) removing said minidisc;

D) cutting a notch in the rear of said upper housing shell;

E) temporarily placing both halves of the upper and lower housing shell back together and determining a center of said opening;

F) separating the upper and lower housing shells and forming a hole in the upper housing shell;

G) temporarily placing both halves of the upper and lower housing shell back together to determine an alignment point on the lower housing shell with said hole;

H) fixedly attaching a photodetector on the upper housing shell at the determined center point of said opening;

I) electrically connecting an electrical connector to said photodetector and exposing said electrical connector through said notch;

J) fixedly attaching a variable resistor on the lower housing at the alignment point with said hole;

K) electrically connecting said photodetector and said variable resistor in parallel with said electrical connector;

L) realigning and reassembling the upper and lower housing shell together to form said housing;

M) re-attaching the shutter to said housing; and

N) electrically connecting said electrical connector to a power metering module.

* * * * *